United States Patent [19]

McMahon

[11] Patent Number: 4,529,906

[45] Date of Patent: Jul. 16, 1985

[54] MOVING COIL LINEAR ACTUATOR

[75] Inventor: Garfield W. McMahon, Dartmouth, Canada

[73] Assignee: Her Majesty the Queen as represented by the Minister of National Defence of Her Majesty's Canadian Government, Ottawa, Canada

[21] Appl. No.: 586,726

[22] Filed: Mar. 6, 1984

Related U.S. Application Data

[63] Continuation of Ser. No. 402,924, Jul. 29, 1982, abandoned.

[30] Foreign Application Priority Data

Oct. 21, 1981 [CA] Canada ................................. 388404

[51] Int. Cl.³ ............................................. H02K 41/02
[52] U.S. Cl. ............................................. 310/13; 310/27
[58] Field of Search .............................. 310/13, 27, 12

[56] References Cited

U.S. PATENT DOCUMENTS

| 3,619,673 | 11/1971 | Helms | 310/13 |
| 3,743,870 | 7/1973 | Hunt | 310/13 |
| 4,002,935 | 1/1977 | Brauer | 310/27 |

*Primary Examiner*—Donovan F. Duggan
*Attorney, Agent, or Firm*—William R. Hinds

[57] ABSTRACT

An electromagnetic apparatus comprises a magnetic assembly having an annular air gap, a wire coil, and an arrangement for energizing the coil only in the air gap, the magnetic assembly being disposed coaxially of the coil so that the coil is movable in the air gap relative to the magnetic assembly. The preferred coil is formed of a plurality of narrow segments axially adjacent and electrically connected in series, successive segments abutting one another, each segment being spirally wound from radially overlapping and abutting turns of wire, the abutting segments being alternately wound inwardly and outwardly such that adjacent sections spiral radially in opposite directions and being electrically connected so that current will flow in the same circumferential direction throughout the coil. The number of turns of wire in the air gap is maximized, ohmic heating of the coil occurs only in that portion which is energized in the air gap, and the magnetic force available from the coil in the air gap is maximized for a given magnetic flux density and a given coil current, while retaining linearity of force obtainable over the length of the coil. The coil segments may be separately formed and axially assembled, and wire of rectangular cross section preferably is used.

17 Claims, 4 Drawing Figures

MOVING COIL LINEAR ACTUATOR

This is a continuation of application Ser. No. 402,924 filed July 29, 1982, now abandoned.

This invention relates to a moving coil linear actuator and, in particular, to such an actuator useful as a low frequency underwater sound projector.

Moving coil linear actuators are commonly used in electrodynamic loudspeakers and wide-band underwater sound projectors. The available power output from such devices is limited by the temperature rise due to ohmic heating of the coil. At low frequencies, a large coil displacement is required to achieve high power output. As a result the coil must be long if the driving force is to remain linear and only a small part of the coil is in the air gap at any instant. Although the entire coil is being heated due to its electrical resistance only the portion in the air gap contributes to the useful force. If the coil is made shorter to reduce its resistance, the available stroke over which the force remains linear is reduced or nonlinearity is introduced at displacement peaks.

As a result, known moving coil devices are a compromise between the required stroke, coil length and acceptable nonlinearity. The maximum stroke available with a given magnet design is seldom, if ever, used in acoustic projectors. The power output may be improved by the use of elaborate cooling systems for the coil. The use of square or rectangular wire in the coil will increase the amount of conductor and thus improve both heat and electrical conductivity. Even with cooling systems and rectangular wire coils, the power capability is still limited by coil heating in most cases.

The present invention uses brushes rather than flexible wire leads to provide electrical contact to the coil. The brushes are placed so as to contact the coil as close as possible to the air gap so that only that portion of the coil within the gap is energized. A long coil that allows a stroke almost equal to the magnet depth can be used; ohmic heating will occur only in the portion that is in the air gap at any instant. Because there is always the same amount of energized coil in the air gap, linearity is inherent. The problem of fatigue failure of flexible wire leads is circumvented.

In accordance with the invention, an electromagnetic apparatus comprises in combination, a magnetic assembly having inter alia, an annular air gap, a coil made from wire of a predetermined cross-sectional area, and means to energize the coil only in the air gap. The magnetic assembly is disposed coaxially of the coil, so that the coil is movable in the air gap relative to the magnetic assembly. The coil is formed of a plurality of narrow segments axially adjacent and electrically connected in series, successive segments abutting one another, each segment being spirally wound from radially overlapping and abutting turns of wire. The abutting segments are alternately wound inwardly and outwardly such that adjacent sections spiral radially in opposite directions, and are electrically connected so that current will flow in the same circumferential direction throughout the coil. The construction is such that the number of turns of wire in the air gap is maximized, that ohmic heating of the coil occurs only in that portion thereof which is at that instant energized in the air gap, and the magnetic force available from the energized coil in the air gap is maximized for a given magnetic flux density and a given coil current while retaining linearity of the force obtainable over the length of the coil.

Preferably each segment has a greater number of turns in its radial direction that its axial direction, and it is preferred that each segment has at least two sections of turns in its axial direction and each section of turns has at least three successive turns in its radial direction, adjacent turn sections being spirally wound alternately inwardly and outwardly. Each segment preferably is formed from overlapping turns of wire of rectangular cross section, and the narrow segments may be separately formed and axially assembled.

Preferred embodiments of the invention will now be described in conjunction with the accompanying drawings, in which.

DESCRIPTION OF THE PREFERRED EMBODIMENTS

Figure 1:
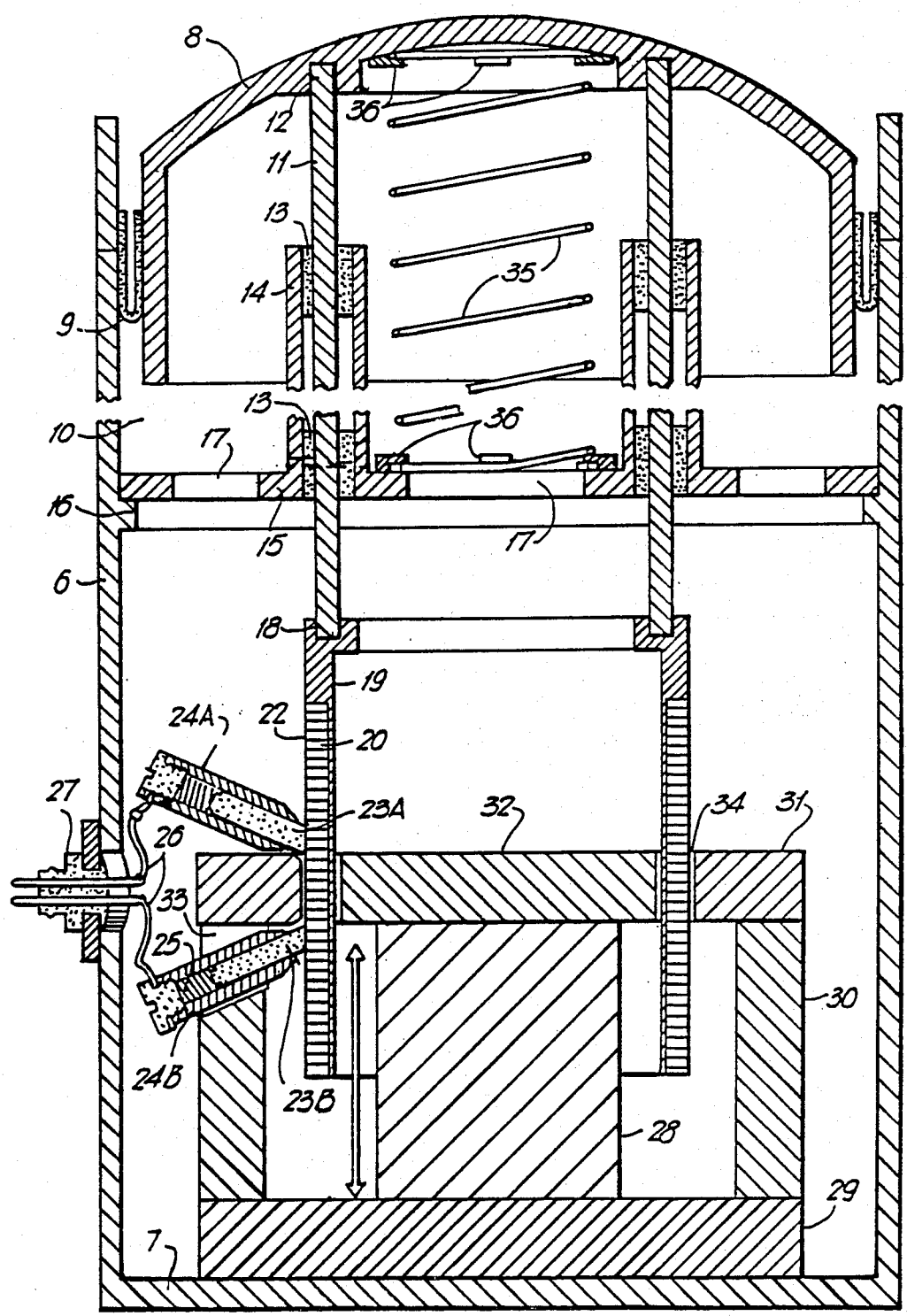
FIG. 1 is a cross-sectional view of a low frequency underwater sound projector constructed in accordance with the invention.

FIG. 1 shows in cross section a moving coil linear actuator constructed in accordance with the teachings of the present invention. The particular embodiment relates to an underwater sound projector having a cylindrical housing 6.

Housing 6 is closed at one end by a plate 7 and has at its open end a piston 8 mounted for longitudinal movement, thereby to radiate sound into the water. A rolling rubber seal 9 allows free axial motion of the piston while preventing ingress of water into the internal air cavity 10. The quiescent internal air pressure in the air cavity is maintained equal to the outside water pressure by means that are well known in the art.

The piston is guided for axial motion by rods 11 attached to the piston at 12 and sliding in linear bearings 13. The linear bearings are supported by cylindrical sleeves 14 integrally attached to a guide plate 15, which in turn is fastened to a flange 16 on the inner surface of the housing. The guide plate contains several openings 17 to allow free flow of the air from one side to the other as the piston vibrates. For clarity, only two guide rods are shown in the figure but typically three or more would be used.

The ends of the guide rods opposite the piston are attached to one end 18 of a coil form 19 on which the driving coil 20 is wound. The wire used in the coil is rectangular copper wire having a thin coating of enamel insulation. The coil has a smooth conducting outer surface 22 prepared by removing the outer layer of enamel insulation after the coil is wound. A thermosetting resin adhesive is used between the turns of the coil and between the coil and the coil form to bond the coil assembly together.

The coil being coupled to the piston via the guide rods is constrained to move in a precisely axial direction. Brushes 23A and 23B are held in suitable brush holders 24A and 24B with springs 25 to keep the brushes in close contact with the conducting outer coil surface. The brushes are placed so as to contact the coil as closely as possible to the air gap so that only that portion of the coil within the gap is energized. The brush holders are made from a durable metal of low electrical resistance such as brass so as to make good electrical contact with the brushes. The brushes are made from a graphite or graphite-copper composition so as to generate a low frictional drag on the coil as the coil moves. Wire connections 26 from the brush holders are taken to a waterproof connector 27 mounted in the wall of the housing to provide electrical current to the actuator via an external waterproof electrical cable, not shown.

The magnet assembly of the projector consists of a permanent magnet 28, a base plate 29, an outer ring 30, a top ring 31 and a pole piece 32. An opening 33 is provided in the outer ring to accommodate the brush holder 24B. The permanent magnet is typically made from a high energy magnet material such as Alnico V or Alnico V-7. The outer parts of the magnet assembly are typically mild steel. The air gap 34 of the magnet assembly between top ring 31 and pole piece 32 is precisely aligned axially with the coil so that the coil can move freely in the air gap.

The maximum stroke available for the coil is the distance from the brush 23B to the upper surface of base plate 29. The quiescent position for the coil is at midstroke, as drawn in the diagram with a spring 35 providing a restoring force tending to return the coil to midstroke whenever any displacement occurs. The spring is attached at one end to the piston and at the other end to the guide plates 15 by clips 36.

The magnet assembly is attached to the end plate by suitable means such as bolting and, similarly, the guide plate 15 is attached to the flange 16 by suitable means such as bolting or welding. The insulating support for brush holder 24A has been omitted for clarity in the drawing but it will be clear that the brush holders must be electrically insulated from one another.

In operation of the underwater sound projector it is first placed at the required operating depth in water while the internal air pressure and external water pressure are maintained equal. An alternating electrical signal, at the desired frequency, is applied to the coil via connector 27 and brushes 23 and an alternating force results from the interaction between the current in the coil and the magnet. This force is given by Bli were B is the magnetic flux density in the air gap 34, l is the total length of coil in the air gap and i is the coil current. This force causes the coil, the guide rods and the piston to move axially against the restraining force of the spring 35 and the air in the air cavity 10, which is alternately compressed and expanded. Movement of the outside water by the piston results in sound to be radiated into the water at the applied frequency.

The coil as depicted in FIG. 1 has relatively few turns of large rectangular wire wound on edge thus having a low resistance, requiring a high current to achieve the maximum force. In such a situation the brush resistance might make up a large part of the total electrical resistance which would be undesirable. Preferably, rectangular wire is used that is much thinner axially than shown in FIG. 1, thus greatly reducing the current. Enameled wire of annealed copper is best for this purpose.

Figure 3:
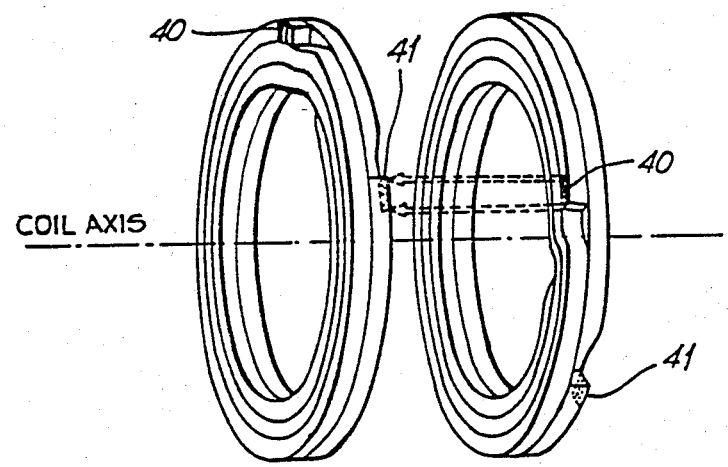
FIG. 3 shows two adjacent coil segments in exploded view.
Figure 2A:
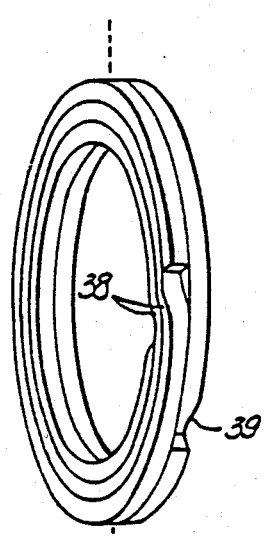
FIGS. 2A and 2B show a coil segment useful in one embodiment of the invention.
Figure 2B:
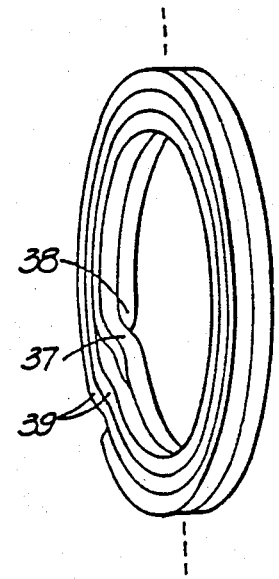

Another embodiment of the present invention is shown in FIGS. 2 and 3. The coil is formed in segments of square enameled wire. Each segment comprises two turns or sections in axial length but several layers in radial thickness; in this case three layers are shown. FIG. 2A shows one view of a segment, and FIG. 2B another view rotated 180° about the dashed line. The wire in the innermost layer is taken from one axial position of the coil to an adjacent axial position in an axially-extended S-bend 37 and the succeeding turns of wire are wound over the inner layers in a series of radially-extending S-bends 38 and 39. All surfaces between the turns of each segment are bonded by a suitable adhesive such as a thermosetting epoxy resin.

A complete coil is made up of segments bonded together coaxially on a suitable form. Before assembly, the enamel insulation is removed from areas 40 and 41 at both ends of each coil segment as shown in FIG. 3. On assembly, the area 40 of one segment is aligned with the area 41 of the adjacent segment. The two areas are soldered to join the two segments electrically. A continuous coil of the required length is built up in this fashion. The segments are bonded together by a suitable adhesive such as epoxy film adhesive. Again, the outer layer of enamel insulation is removed from the assembled coil to provide a smooth surface giving good contact with the brushes. The outer surface of the coil will have depressions at portions corresponding to the underlying radial S-bends in the wire. The assembly of the segments is such as to leave longitudinal strips of the surface free from such depressions and the brushes contact such longitudinal strips.

Thus, various embodiments of a moving coil linear actuator have been described. It will be clear to those skilled in the art that minor variations can be made in these embodiments without departing from the scope of the invention. Although only one centering spring 35 is shown in FIG. 1, a plurality of springs may be used, one associated with each guide rod. Similarly, more than one pair of brushes may be used. Details of a prior art pressure compensating system are found in a report by G. D. Hugus III, "Pressure-Compensating Systems for Underwater Gas-Filled Electroacoustic Transducers", NRL Memorandum Report 2955, 1 Dec. 1974, NRL Underwater Sound Reference Division, P.O. Box 8337, Orlando, Fla. 32806.

The embodiments of the invention in which an exclusive property or privilege is claimed are defined as follows:

1. An electromagnetic apparatus comprising in combination, a magnetic assembly having inter alia, an annular air gap, a coil made from wire of a predetermined cross-sectional area, and means to energize the coil only in the air gap, the magnetic assembly being disposed coaxially of the coil, so that the coil is movable in said air gap relative to said magnetic assembly; wherein said coil is formed of a plurality of narrow segments axially adjacent and electrically connected in series, successive segments abutting one another, each segment being spirally wound from radially overlapping and abutting turns of wire, said abutting segments being alternately wound inwardly and outwardly such that adjacent segments spiral radially in opposite directions and being electrically connected so that current will flow in the same circumferential direction throughout the coil, the construction being such that the number of turns of wire in said air gap is maximized, that ohmic heating of the coil occurs only in that portion thereof which is at that instant energized in the air gap and the magnetic force available from the energized coil in said air gap is maximized for a given magnetic flux density and a given coil current while retaining linearity of said force obtainable over the length of the coil.

2. An apparatus as claimed in claim 1 wherein each segment has a greater number of turns in its radial direction than its axial direction.

3. An apparatus as claimed in claim 2 wherein each segment has at least two sections of turns in its axial direction and each section of turns has at least three successive turns in its radial direction, adjacent turn sections being spirally wound alternately inwardly and outwardly.

4. An apparatus as claimed in claim 2 wherein each coil segment comprises a number of turns of wire including input and output ends thereof, said wire spiralling inwardly at one axial position followed by the wire spiralling outwardly at the adjacent axial position, said wire being electrically connected at said ends to adjacent wires of adjacent segments in a manner that provides linearity of the magnetic force obtainable over the length of the energized coil.

5. An apparatus as claimed in claim 1 wherein each coil segment comprises a number of axially adjacent spirally wound sections of wire including input and output ends thereof, adjacent sections being alternately wound inwardly and outwardly such that adjacent sections spiral radially in opposite directions, said wire being electrically connected at said ends to adjacent wires of adjacent sections in a manner that provides linearity of the magnetic force obtainable over the length of the energized coil.

6. Apparatus as claimed in claim 1 wherein said wire is of rectangular cross-section.

7. Apparatus as claimed in claim 1 wherein said narrow segments are separately formed and subsequently axially assembled and electrically connected.

8. A linear actuator comprising a magnetic assembly having inter alia, an annular air gap, a coil made from wire of a predetermined cross-section area, and means to energize the coil only in the air gap, the magnetic assembly being disposed coaxially of the coil, so that the coil is movable in said air gap relative to said magnetic assembly; wherein said coil is formed of a plurality of separately formed narrow segments axially assembled and electrically connected in series, successive segments abutting one another, each segment being formed from overlapping turns of wire of rectangular cross section, said abutting segments being alternately wound inwardly and outwardly such that adjacent segments spiral radially in opposite directions and being electrically connected so that current will flow in the same circumferential direction throughout the coil, the construction being such that the number of turns of wire in said air gap is maximized, so that ohmic heating of the coil occurs only in that portion thereon which is at that instant energized in the air gap and the magnetic force available from the energized coil in said air gap is maximized for a given magnetic flux density and a given coil current while retaining linearity of said force obtainable over the length of the coil.

9. An apparatus as claimed in claim 8 wherein each segment has a greater number of turns in its radial direction than its axial direction.

10. An apparatus as claimed in claim 9 wherein each segment has at least two sections of turns in its axial direction and each section of turns has at least three successive turns in its radial direction, adjacent turn sections being spirally wound alternately inwardly and outwardly.

11. An apparatus as claimed in claim 9 wherein each coil segment comprises a number of turns of wire including input and output ends thereof, said wire spiralling inwardly at one axial position followed by the wire spiralling outwardly at the adjacent axial position, said wire being electrically connected at said ends to adjacent wires of adjacent segments in a manner that provides linearity of the magnetic force obtainable over the length of the energized coil.

12. An apparatus as claimed in claim 8 wherein each coil segment comprises a number of axially adjacent spirally wound sections of wire including input and output ends thereof, adjacent sections being alternately wound inwardly and outwardly such that adjacent sections spiral radially in opposite directions, said wire being electrically connected at said ends to adjacent wires of adjacent sections in a manner that provides linearity of the magnetic force obtainable over the length of the energized coil.

13. A linear actuator comprising:
a housing open at one end;
a piston received in sealing relationship in said end;
an electromagnetic assembly having a coil and magnet assembly positioned in said housing at the end remote from said open end, a circular slot being formed in said magnet assembly to define a magnetic flux air gap, said magnet assembly being disposed coaxially of the coil, so that the coil is movable in said air gap relative to said magnetic assembly;
said coil comprising a cylindrical coil formed of a plurality of narrow coil segments axially adjacent and electrically connected in series, successive segments abutting one another, each coil segment having several radially overlapping and abutting turns of wire, said abutting segments being alternately wound inwardly and outwardly such that adjacent segments spiral radially in opposite directions and being electrically connected so that current will flow in the same circumferential direction throughout the coil, the construction being such that for a wire of a predetermined cross-sectional area, the number of energized turns of wire in said air gap is maximized;
a coupling member rigidly connecting said coil and said piston;
a spring positioning the coil and piston assembly with the coil received in the magnetic flux air gap;
a pair of electrical brushes in slideable relationship with and electrically contacting the outer surface of said coil immediately above and below said air gap, and electrical contacts in the wall of said housing electrically connected to said brushes;
whereby in operation the actuator current flows through the coil only in the section positioned in the air gap such that ohmic heating of the coil occurs only in that portion thereof and the magnetic force available from the energized coil in said air gap is maximized for a given magnetic flux density and a given coil current while retaining linearity of said force obtainable over the length of the coil.

14. An apparatus as claimed in claim 13 wherein each segment has a greater number of turns in its radial direction than its axial direction.

15. An apparatus as claimed in claim 14 wherein each coil segment comprises a number of turns of wire including input and output ends thereof, said wire spiralling inwardly at one axial position followed by the wire spiralling outwardly at the adjacent axial position, said wire being electrically connected at said ends to adjacent wires of adjacent segments in a manner that provides linearity of the magnetic force obtainable over the length of the energized coil.

16. An apparatus as claimed in claim 14 wherein each segment has at least two sections of turns in its axial direction and each section of turns has at least three successive turns in its radial direction, adjacent turn sections being spirally wound alternately inwardly and outwardly.

17. An apparatus as claimed in claim 13 wherein each coil segment comprises a number of axially adjacent spirally wound sections of wire including input and output ends thereof, adjacent sections being alternately wound inwardly and outwardly such that adjacent sections spiral radially in opposite directions, said wire being electrically connected at said ends to adjacent wires of adjacent sections in a manner that provides linearity of the magnetic force obtainable over the length of the energized coil.

* * * * *